United States Patent
Grier et al.

[19]

[11] Patent Number: 6,055,106

[45] Date of Patent: Apr. 25, 2000

[54] APPARATUS FOR APPLYING OPTICAL GRADIENT FORCES

[75] Inventors: David G. Grier; Eric R. Dufresne, both of Chicago, Ill.

[73] Assignee: Arch Development Corporation, Chicago, Ill.

[21] Appl. No.: 09/017,923

[22] Filed: Feb. 3, 1998

[51] Int. Cl.[7] .............................. G02B 5/18; G02B 15/32
[52] U.S. Cl. ........................... 359/566; 359/15; 359/434
[58] Field of Search .................................. 359/9, 15, 16, 359/19, 20, 27, 558, 566, 571, 434; 349/201, 202

[56] References Cited

U.S. PATENT DOCUMENTS

| | | | |
|---|---|---|---|
| 3,710,279 | 1/1973 | Ashkin | 331/94.5 |
| 3,793,541 | 2/1974 | Ashkin et al. | 307/88.3 |
| 3,808,432 | 4/1974 | Ashkin | 250/251 |
| 3,808,550 | 4/1974 | Ashkin | 372/97 |
| 4,127,329 | 11/1978 | Chang et al. | 356/301 |
| 4,627,689 | 12/1986 | Asher | 350/362 |
| 4,827,125 | 5/1989 | Goldstein | 250/234 |
| 4,893,886 | 1/1990 | Ashkin et al. | 350/1.1 |
| 5,029,791 | 7/1991 | Ceccon et al. | 248/287 |
| 5,079,169 | 1/1992 | Chu et al. | 436/174 |
| 5,113,286 | 5/1992 | Morrison | 359/569 |
| 5,198,369 | 3/1993 | Itoh et al. | 436/534 |
| 5,245,466 | 9/1993 | Burns et al. | 359/234 |
| 5,327,515 | 7/1994 | Anderson et al. | 359/566 |
| 5,343,038 | 8/1994 | Nishiwaki et al. | 250/234 |
| 5,355,252 | 10/1994 | Haraguchi | 359/369 |
| 5,364,744 | 11/1994 | Buican et al. | 430/321 |
| 5,374,556 | 12/1994 | Bennett et al. | 435/287 |
| 5,445,011 | 8/1995 | Ghislain et al. | 73/105 |
| 5,452,123 | 9/1995 | Asher et al. | 359/296 |
| 5,473,471 | 12/1995 | Yamagata et al. | 359/569 |
| 5,512,745 | 4/1996 | Finer et al. | 350/251 |
| 5,629,802 | 5/1997 | Clark | 359/573 |
| 5,689,109 | 11/1997 | Schutze | 250/251 |
| 5,776,674 | 7/1998 | Ulmer | 435/6 |

OTHER PUBLICATIONS

Chiou, Arthur E. et al., "Interferometric optical tweezers," Optics Communications, vol. 133, pp. 7–10, (Jan. 1, 1997).

D. G. Grier, "Description of Optical Tweezer Arrays and Optical Substrates Created with Diffractive Optical Elements", pp. 1–6, Dec. 22, 1997.

E. R. Dufresne and D. G. Grier, "Optical Tweezer Arrays and Optical Substrates Created with Diffractive Optics", pp. 1–6, Nov. 12, 1997.

J. H. Holtz and S. A. Asher, "Polymerized Colloidal Crystal Hydrogel Films as Intelligent Chemical Sensing Materials", Nature, vol. 389, pp. 829–832, Oct. 23, 1997.

E. R. Dufresne and D. G. Grier, "Embraced by the Light: Diffractive Optical Substrates and the Hexadeca Tweezer", pp. 1–4, Oct. 22, 1997.

D. G. Grier, "New Age Crystals", pp. 1–2, Oct. 14, 1997.

A. Ashkin, "Optical Trapping and Manipulation of Neutral Particles Using Lasers", Proc. Natl. Acad. Sci. USA, vol. 94, pp. 4853–4860, May 1997.

E. Fallman and O. Axner, "Design for Fully Steerable Dual–Trap Optical Tweezers", Applied Optics, vol. 36, No. 10, pp. 2107–2113, Apr. 1, 1997.

(List continued on next page.)

Primary Examiner—Jon Henry
Attorney, Agent, or Firm—Michael D. Rechtin; Foley & Lardner

[57] ABSTRACT

An apparatus and method for manipulating small dielectric particles. The apparatus and method involves use of a diffractive optical element which receives a laser beam and forms a plurality of light beams. These light beams are operated on by a telescope lens system and then an objective lens element to create an array of optical traps for manipulating small dielectric particles.

49 Claims, 5 Drawing Sheets

OTHER PUBLICATIONS

A. van Blaaderen, R. Ruel, P. Wiltzius, "Template–Directed Colloidal Crystallization", Nature, vol. 385, pp. 321–324, Jan 23, 1997.

A. E. Chiou et al., "Interferometric Optical Tweezers", Optics Communications 133, pp. 7–10, Jan. 1, 1997.

K. Visscher, S. P. Gross, S. M. Block, "Construction of Multiple–Beam Optical Traps with Nanometer–Resolution Position Sensing", IEEE Journal of Selected Topics in Quantum Electronics, vol. 2, No. 4, pp. 1066–1075, Dec. 1996.

A. Suzuki, T. Ishii, Y. Maruyama, "Optical Switching in Polymer Gels", J. Appl. Phys. 80(1), pp. 131–136, Jul. 1, 1996.

A. Suzuki, H. Suzuki, "Hysteretic Behavior and Irreversibility of Polymer Gels by pH Change", J. Chem. Phys. 103/911), pp. 4706–4710, Sep. 15, 1995.

X.–D. Xiang et al., "A Combinatorial Approach to Materials Discovery", Science, vol. 268, pp. 1738–1740, Jun. 23, 1995.

C. A. Murray and D. G. Grier, "Colloidal Crystals", American Scientist, vol. 83, pp. 238–245, May–Jun. 1995.

T. G. Mason and D. A. Weitz, "Optical Measurements of Frequency–Dependent Linear Viscoelastic Moduli of Complex Fluids", Physical Review Letters, vol. 74, No. 7, pp. 1250–1253, Feb. 13, 1995.

J. C. Crocker and D. G. Grier, "Microscopic Measurement of the Pair Interaction Potential of Charge–Stabilized Colloid", Physical Review Letters, vol. 73, No. 2, pp. 352–355, Jul. 11, 1994.

K. Sasaki et al., "Optical Micromanipulation of a Lasing Polymer Particle in Water", Jpn. J. Appl. Phys., vol. 32, Part 2, No. 8B, pp. L 1144–L 1147, Aug. 15, 1993.

R. S. Afzal and E. B. Treacy, "Optical Tweezers Using a Diode Laser", Rev. Sci. Instrum. 63(4), pp. 2157–2163, Apr. 1992.

A. Ashkin, "Forces of a Single–Beam Gradient Laser Trap on a Dielectric Sphere in the Ray Optics Regime", Biophysical Journal, vol. 61, pp. 569–582, Feb. 1992.

H. Misawa et al., "Multibeam Laser Manipulation and Fixation of Microparticles", Appl. Phys. Lett., vol. 60, No. 3, pp. 310–312, Jan. 20, 1992.

K. Sasaki et al., "Pattern Formation and Flow Control of Fine Particles by Laser–Scanning Micromanipulation", Optics Letters, vol. 16, No. 19, pp. 1463–1465, Oct. 1, 1991.

K. Sasaki et al., "Laser–Scanning Micromanipulation and Spatial Patterning of Fine Particles", Japanese Journal of Applied Physics, vol. 31, No. 5B, pp. L 907–L 909, May 1991.

H. Misawa et al., "Spatial Pattern Formation, Size Selection, and Directional Flow of Polymer Latex Particles by Laser Trapping Technique", Chemistry Letters, 469–472, 1991.

M. M. Burns et al., "Optical Matter: Crystallization and Binding in Intense Optical Fields", Science, vol. 249, pp. 749–754, Aug. 17, 1990.

M. M. Burns et al., "Optical Binding", Physical Review Letters, vol. 63, No. 12, pp. 1233–1236, Sep. 18, 1989.

A. Ashkin et al., "Optical Trapping and Manipulation of Single Cells Using Infrared Laser Beams", Nature, vol. 330, pp. 769–771, Dec. 24/31, 1987.

A. Ashkin et al., "Observation of a Single–Beam Gradient Force Optical Trap for Dielectric Particles", Optics Letters, vol. 11, No. 5, pp. 288–290, May 1986.

A. Chowdhury, B. J. Ackerson, N. Clark, "Laser–Induced Freezing", Physical Review Letters, vol. 55, No. 8, pp. 833–836, Aug. 19, 1985.

J–M. R. Fournier et al., "Writing Diffractive Structures by Optical Trapping", SPIE vol. 2406, pp. 101–111.

Cell Robotics LaserTweezers™ 1000 Series, by Cell Robotics Inc.

APPARATUS FOR APPLYING OPTICAL GRADIENT FORCES

This invention was made with U.S. Government support under Contract No. DMR-9320278 awarded by the National Science Foundation, through the MRSEC Program of the National Science Foundation under Award No. DMR-9400379, and through a GAANN fellowship from the Department of Education.

The present invention is related generally to a method and apparatus for manipulating small dielectric particles or other materials using optical gradient forces. In particular, the invention is related to a method and apparatus which uses focused laser light directed by a diffractive optical element, such as a hologram or diffraction grating, to create any one of a variety of selectable optical field patterns to assemble or direct particulate materials, or other affected materials, into a desired spatial pattern for any one of a myriad of uses.

It is known to construct optical tweezers using optical gradient forces from a single beam of light to manipulate the position of a small dielectric particle immersed in a fluid medium whose refractive index is smaller than that of the particle. The optical tweezer technique has been generalized to enable manipulation of reflecting, absorbing and low dielectric constant particles as well.

The current conventional systems therefore can manipulate a single particle by using a single beam of light to generate a single optical trap. To manipulate multiple particles with such systems, multiple beams of light must be employed. The difficulty of creating extended multiple-beam traps using conventional optical tweezer methodology inhibits their use in many potential commercial applications such as the fabrication and manipulation of nanocomposite materials including electronic, photonic and opto-electronic devices, chemical sensor arrays for use in chemical and biological assays, and holographic and computer storage matrices.

It is therefore an object of the invention to provide an improved method and system for establishing a plurality of optical traps.

It is another object of the invention to provide a novel method and system for using a single beam of light with diffractive optics for forming a configuration of light beams for establishing a plurality of optical traps.

It is an additional object of the invention to provide a novel method and apparatus for using holograms for generating an optical gradient field for controlling a plurality of particles or other optical media.

It is a further object of the invention to provide an improved method and system for establishing a plurality of optical traps for a variety of commercial applications relating to manipulation of small particles such as in photonic circuit manufacturing, nanocomposite material applications, fabrication of electronic components, opto-electronic devices, chemical and biological sensor arrays, assembly of holographic data storage matrices, facilitation of combinatorial chemistry applications, promotion of colloidal self-assembly, and the manipulation of biological materials.

It is still another object of the invention to provide an improved method and system for constructing a temporally and spatially varying configuration of optical gradient fields for commercial applications.

It is also an object of the invention to provide a novel method and system for using one or more laser beams in conjunction with one or more diffractive optical elements for constructing a selectable time varying and/or particular spatial array of optical traps for manipulating a dielectric material.

It is yet a further object of the invention to provide an improved method and system using a single input laser beam, a diffractive optical element, and a diverging and/or converging lens to form a static or dynamic optical trap.

It is still an additional object of the invention to provide a novel method and system for constructing an optical trap array which is directly observable by a user.

It is also a further object of the invention to provide an improved method and system employing a laser beam input to a diffractive optical element with a beam scanning system enabling scanning of an array of optical traps for various commercial applications.

It is in addition another object of the invention to provide a novel method and apparatus for constructing an optical trap configuration using a laser beam, a diffractive optical element and a diverging or converging optical system to form the trap configuration at a selectable location relative to an objective lens focal plane.

It is still another object of the invention to provide an improved method and apparatus for using a laser beam and an obliquely positioned diffractive optical element to filter out any undiffracted beam for efficient utilization of only a diffracted optical beam in constructing an optical trap arrangement.

It is yet another object of the invention to provide a novel method and apparatus for using a laser beam input to a diffractive optical element to generate at least a two-dimensional arrangement of optical traps out of the focal plane of an objective lens.

It is also yet another object of the invention to provide an improved method and system for employing a light beam and diffractive optics in conjunction with a plurality of telescope lenses to scan an optical trap array.

It is yet an additional object of the invention to provide a novel method and system for establishing an array of optical traps using a single light beam input to a diffractive optical element and an optical system for controllably scanning the optical trap array such that small amplitude oscillatory displacements are applied to dynamically stiffen the optical traps.

It is another object of the invention to provide a novel method for creating multiple independently steered optical traps using a time-dependent addressable phase-shifting medium (such as a liquid crystal phase shifting array) as a diffractive optical element.

It is a further object of the invention to provide a novel method for creating time-dependent optical gradient fields for the segregation of microscopic particles.

It is yet another object of the invention to provide a novel method for manipulating a plurality of biological objects including the crystallization of proteins.

Other objects, features and advantages of the present invention will be readily apparent from the following description of the preferred embodiments thereof, taken in conjunction with the accompanying drawings described below wherein like elements have like numerals throughout.

DETAILED DESCRIPTION OF THE PREFERRED EMBODIMENTS

Figure 1:
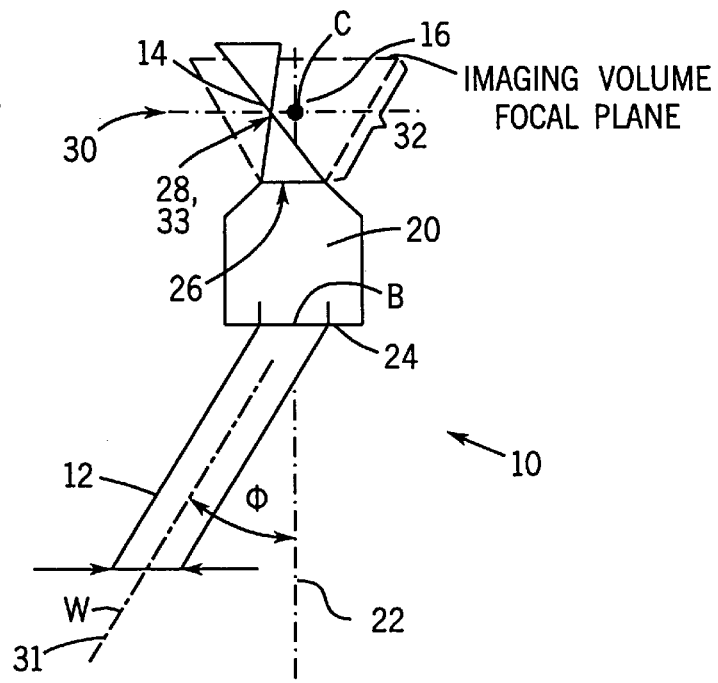
FIG. 1 illustrates a prior art method and system for a single optical tweezer.
Figure 2:
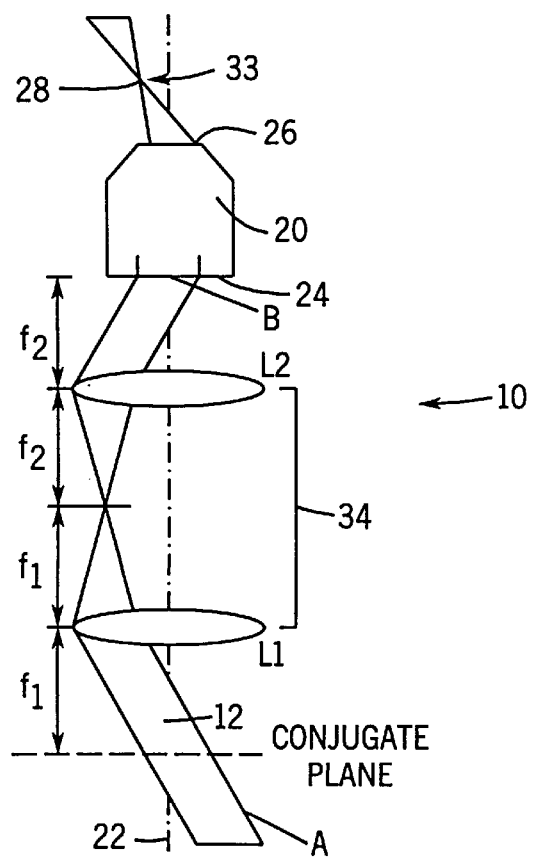
FIG. 2 illustrates a prior art method and system for a single, steerable optical tweezer.

In order to best understand the improvement of the invention, FIGS. 1 and 2 illustrate several prior art methods and systems. These systems will first be reviewed, and then the invention will be described in terms of the preferred embodiment examples of FIGS. 3–7A and 7B. In prior art optical tweezer system 10 of FIG. 1, optical gradient forces arise from use of a single beam of light 12 to controllably manipulate a small dielectric particle 14 dispersed in a medium 16 whose index of refraction, $n_m$, is smaller than that of the particle 14. The nature of the optical gradient forces is well known, and also it is well understood that the principle has been generalized to allow manipulation of reflecting, absorbing and low dielectric constant particles as well. Any of these techniques can be implemented in the context of the invention described hereinafter and will be encompassed by use of the terminology optical tweezer, optical trap and optical gradient force trap hereinafter.

The optical tweezer system 10 is applied by using a light beam 12 (such as a laser beam) capable of applying the necessary forces needed to carry out the optical trapping effect needed to manipulate a particle. The objective of a conventional form of the optical tweezer 10 is to project one or more shaped beams of light into the center of a back aperture 24 of a converging optical element (such as an objective lens 20). As noted in FIG. 1 the light beam 12 has a width "w" and having an input angle ϕ relative to an optical axis 22. The light beam 12 is input to a back aperture 24 of the objective lens 20 and output from a front aperture 26 substantially converging to a focal point 28 in focal plane 30 of imaging volume 32 with the focal point 28 coinciding with an optical trap 33. In general, any focusing optical system can form the basis for the optical tweezer system 10.

In the case of the light beam 12 being a collimated laser beam and having its axis coincident with the optical axis 22, the light beam 12 enters the back aperture 24 of the objective lens 20 and is brought to a focus in the imaging volume 32 at the center point c of the objective lens focal plane 30. When the axis of the light beam 12 is displaced by the angle ϕ with respect to the optical axis 22, beam axis 31 and the optical axis 22 coincide at the center point B of the back aperture 12. This displacement enables translation of the optical trap across the field of view by an amount that depends on the angular magnification of the objective lens 20. The two variables, angular displacement ϕ and varying convergence of the light beam 12, can be used to form the optical trap at selected positions within the imaging volume 32. A multiple number of the optical traps 33 can be arranged in different locations provided that multiple beams of light 12 are applied to the back aperture 24 at the different angles ϕ and with differing degrees of collimation.

In order to carry out optical trapping in three dimensions, optical gradient forces created on the particle to be trapped must exceed other radiation pressures arising from light scattering and absorption. In general this necessitates having the wave front of the light beam 12 to have an appropriate shape at the back aperture 24. For example, for a Gaussian $TEM_{00}$ input laser beam, the beam diameter w should substantially coincide with the diameter of the back aperture 24. For more general beam profiles (such as Gauss-Laguerre) comparable conditions can be formulated.

In another prior art system in FIG. 2, the optical tweezer system 10 can translate the optical trap 33 across the field of view of the objective lens 20. A telescope 34 is constructed of lenses L1 and L2 which establishes a point A which is optically conjugate to the center point B in the prior art system of FIG. 1. In the system of FIG. 2 the light beam 12 passing through the point A also passes through the point B and thus meets the basic requirements for performing as the optical tweezer system 10. The degree of collimation is preserved by positioning the lenses L1 and L2 as shown in FIG. 2 to optimize the transfer properties of the telescope 34. In addition, the magnification of the telescope 34 can be chosen to optimize angular displacement of the light beam 12 and its width w in the plane of the back aperture 24 of the objective lens 20. As stated hereinbefore, in general several of the light beams 12 can be used to form several associated optical traps. Such multiple beams 12 can be created from multiple independent input beams or from a single beam manipulated by conventional reflective and/or refractive optical elements.

Figure 3:
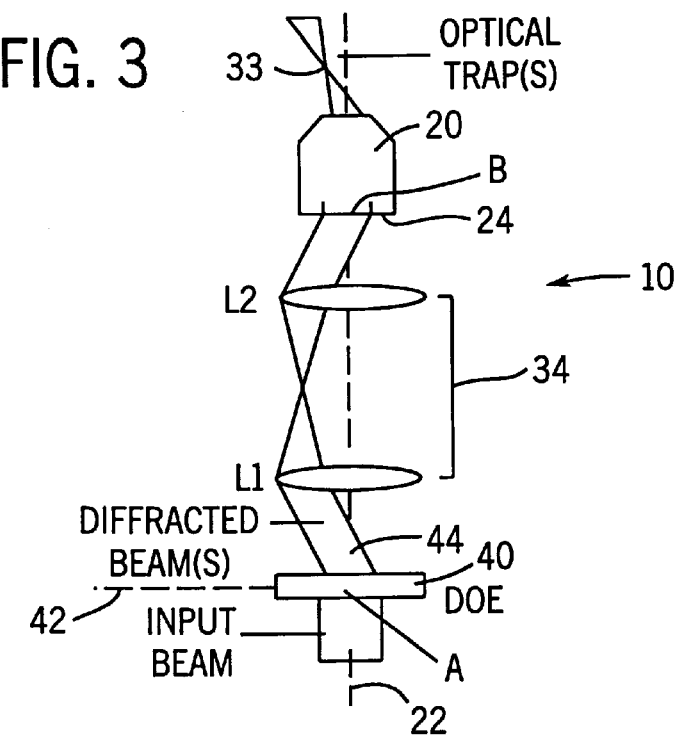
FIG. 3 illustrates a method and system using a diffractive optical element.

In one preferred embodiment of the invention shown in FIG. 3, arbitrary arrays of optical traps can be formed. A diffractive optical element 40 is disposed substantially in a plane 42 conjugate to back aperture 24 of the objective lens 20. Note that only a single diffracted output beam 44 is shown for clarity, but it should be understood that a plurality of such beams 44 can be created by the diffractive optical element 40. The input light beam 12 incident on the diffractive optical element 40 is split into a pattern of the output beam 44 characteristic of the nature of the diffractive optical element 40, each of which emanates from the point A. Thus the output beams 44 also pass through the point B as a consequence of the downstream optical elements described hereinbefore.

The diffractive optical element 40 of FIG. 3 is shown as being normal to the input light beam 12, but many other arrangements are possible. For example, in FIG. 4 the light beam 12 arrives at an oblique angle β relative to the optic axis 22 and not at a normal to the diffractive optical element 40. In this embodiment, the diffracted beams 44 emanating from point A will form optical traps 50 in focal plane 52 of the imaging volume 32 (seen best in FIG. 1). In this arrangement of the optical tweezer system 10 an undiffracted portion 54 of the input light beam 12 can be removed from the optical tweezer system 10. This configuration thus enables processing less background light and improves efficiency and effectiveness of forming optical traps.

The diffractive optical element 40 can include computer generated holograms which split the input light beam 12 into a preselected desired pattern. Combining such holograms with the remainder of the optical elements in FIGS. 3 and 4 enables creation of arbitrary arrays in which the diffractive optical element 40 is used to shape the wavefront of each diffracted beam independently. Therefore, the optical traps 50 can be disposed not only in the focal plane 52 of the objective lens 20, but also out of the focal plane 52 to form a three-dimensional arrangement of the optical traps 50.

Figure 4:
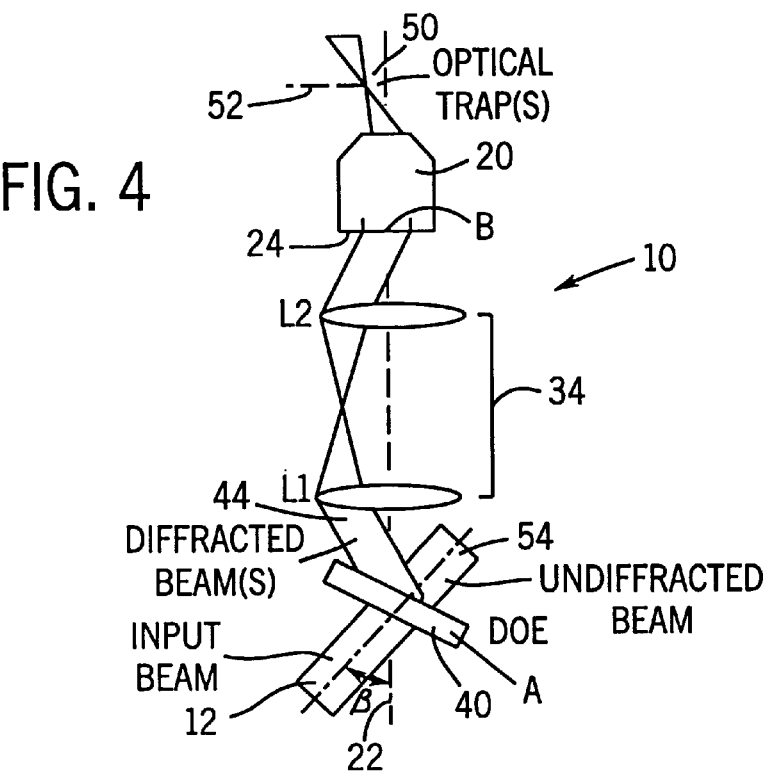
FIG. 4 illustrates another method and system using a tilted optical element relative to an input light beam.

In the optical tweezer system 10 of FIGS. 3 and 4, also included is a focusing optical element, such as the objective lens 20 (or other like functionally equivalent optical device, such as a Fresnel lens) to converge the diffracted beam 44 to form the optical traps 50. Further, the telescope 34, or other equivalent transfer optics, creates a point A conjugate to the center point B of the previous back aperture 24. The diffractive optical element 40 is placed in a plane containing point A.

In another form of the invention, arbitrary arrays of the optical traps 50 can be created without use of the telescope 34. In such an embodiment the diffractive optical element 40 can be placed directly in the plane containing point B.

In the optical tweezer system 10 either static or time dependent diffractive optical elements 40 can be used. For a dynamic, or time dependent version, one can create time changing arrays of the optical traps 50 which can be part of a system utilizing such a feature. In addition, these dynamic optical elements 40 can be used to actively move particles and matrix media relative to one another. For example, the diffractive optical element 40 can be a liquid crystal phase array undergoing changes imprinted with computer-generated holographic patterns.

Figure 5:
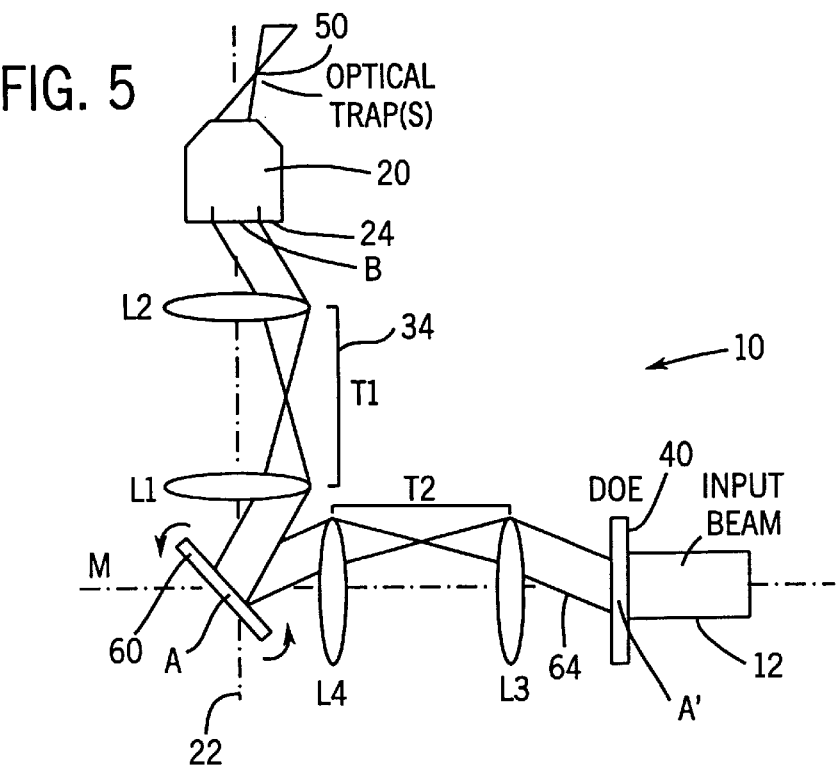
FIG. 5 illustrates a continuously translatable optical tweezer (trap) array using a diffractive optical element.

In another embodiment illustrated in FIG. 5, a system can be constructed to carry out continuous translation of the optical tweezer trap 50. A gimbal mounted mirror 60 is placed with its center of rotation at point A. The light beam 12 is incident on the surface of the mirror 60 and has its axis passing through point A and will be projected to the back aperture 24. Tilting of the mirror 60 causes a change of the angle of incidence of the light beam 12 relative to the mirror 60, and this feature can be used to translate the resulting optical trap 50. A second telescope 62 is formed from lenses L3 and L4 which creates a point A' which is conjugate to point A. The diffractive optical element 40 placed at point A' now creates a pattern of diffracted beams 64, each of which passes through point A to form one of the tweezer traps 50 in an array of the optical tweezers system 10.

In operation of the embodiment of FIG. 5, the mirror 60 translates the entire tweezer array as a unit. This methodology is useful for precisely aligning the optical tweezer array with a stationary substrate to dynamically stiffen the optical trap 50 through small-amplitude rapid oscillatory displacements, as well as for any application requiring a general translation capability.

The array of the optical traps 50 also can be translated vertically relative to the sample stage (not shown) by moving the sample stage or by adjusting the telescope 34. In addition, the optical tweezer array can also be translated laterally relative to the sample by moving the sample stage. This feature would be particularly useful for large scale movement beyond the range of the objective lens field of view.

Figure 6:
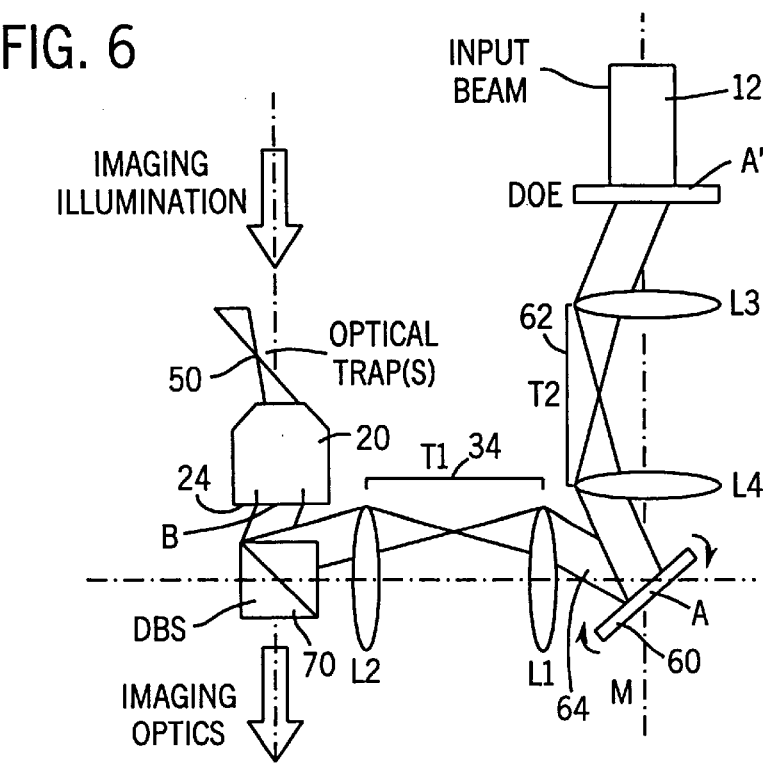
FIG. 6 illustrates a method and system for manipulating particles using an optical tweezer array while also forming an image for viewing the optical trap array.

In another form of the invention shown in FIG. 6 the optical system is arranged to permit viewing images of particles trapped by the optical tweezers 10. A dichroic beamsplitter 70, or other equivalent optical beamsplitter, is inserted between the objective lens 20 and the optical train of the optical tweezer system 10. In the illustrated embodiment the beamsplitter 70 selectively reflects the wavelength of light used to form the optical tweezer array and transmits other wavelengths. Thus, the light beam 12 used to form the optical traps 50 is transmitted to the back aperture 24 with high efficiency while light beam 66 used to form images can pass through to imaging optics (not shown).

Figure 7A:
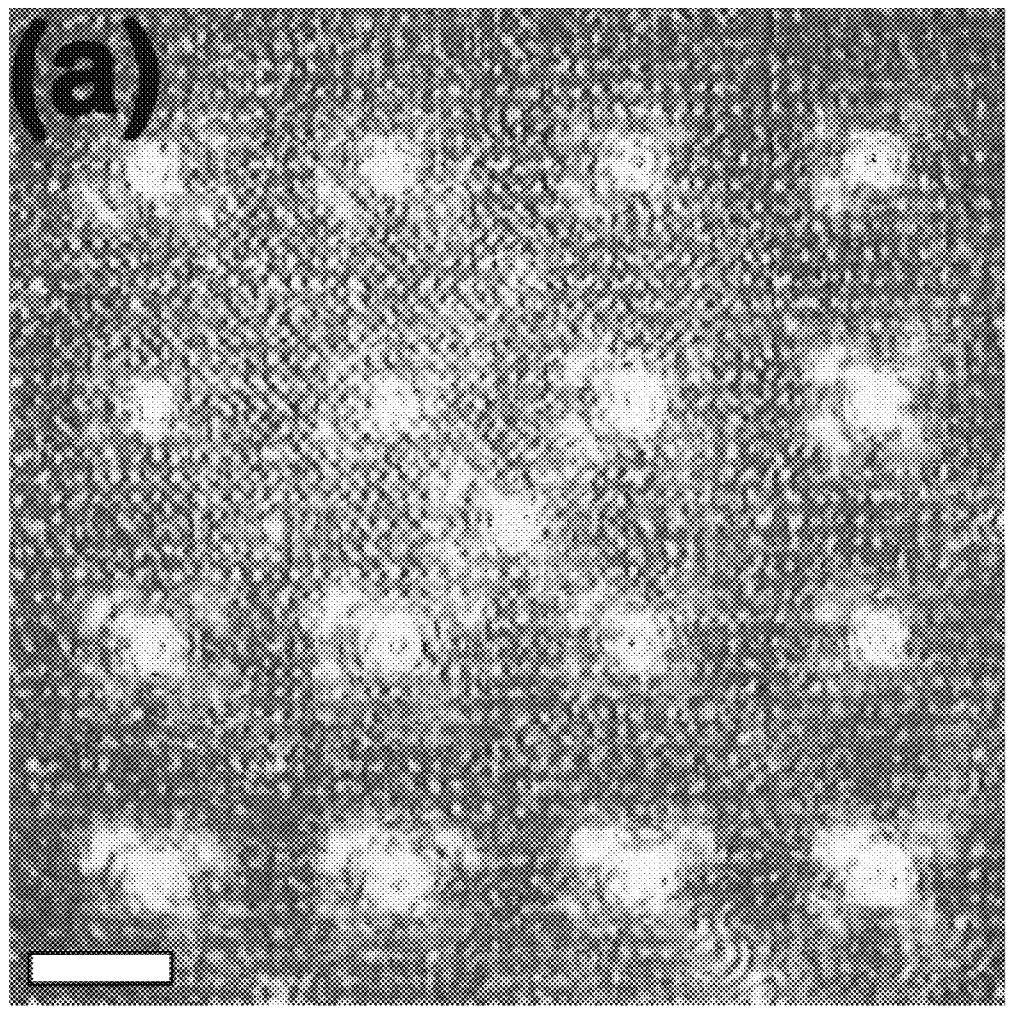
FIG. 7A illustrates an image of a four by four array of optical tweezers (traps) using the optical system of FIG. 6.
Figure 7B:
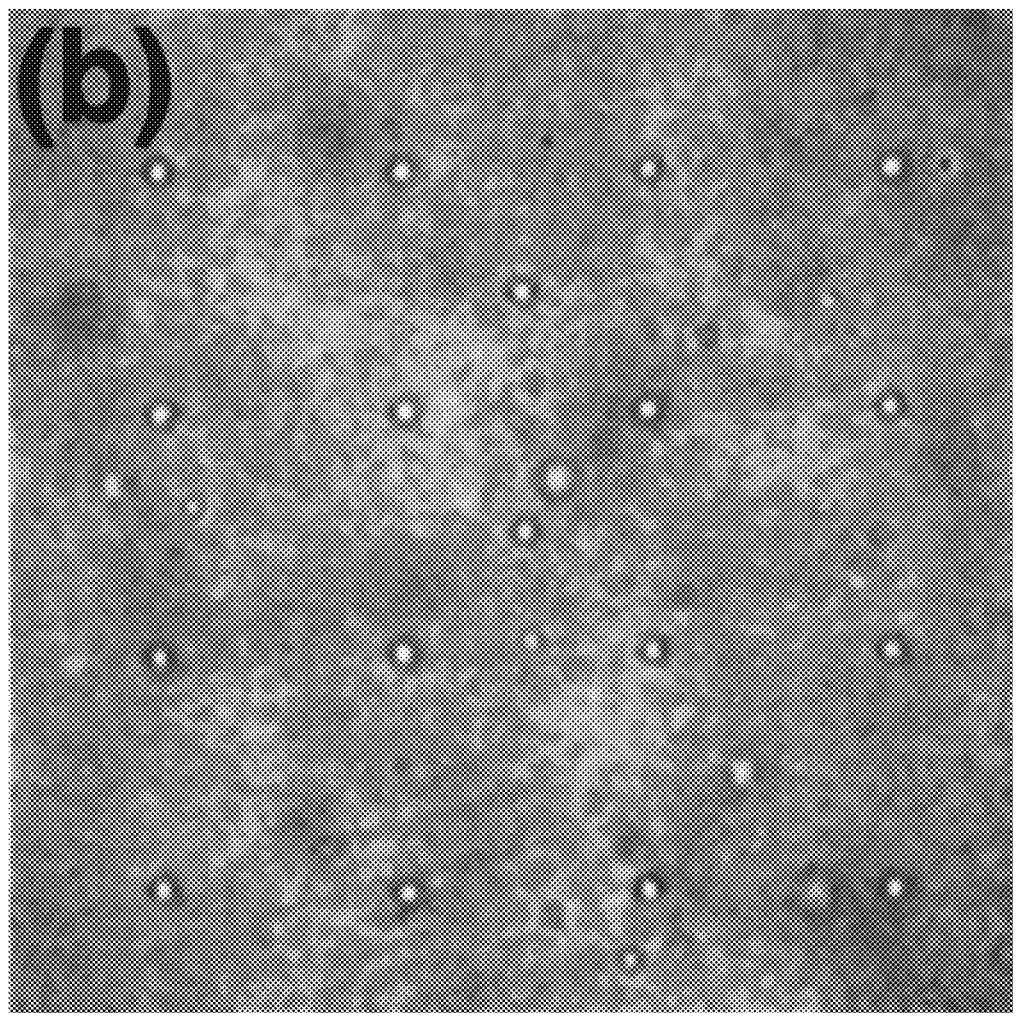
FIG. 7B illustrates an image of one micrometer diameter silica spheres suspended in water by the optical tweezers of FIG. 7A immediately after the trapping illumination has been extinguished, but before the spheres have diffused away.

An illustration of an application of the invention is shown in FIGS. 7A and 7B. The diffractive optical element 40 is designed to interact with the single light beam 12 to create a 4×4 array of collimated beams. A 100 mW frequency doubled diode-pumped Nd:YAG laser operating at 532 nm provides a Gaussian $TEM_{00}$ form for the light beam 12. In FIG. 7A the field of view is illuminated in part by laser light backscattered by sixteen silica spheres trapped in the array's sixteen primary optical tweezers 10. The 1 $\mu$m diameter spheres are dispersed in water and placed in a sample volume between a glass microscope slide and a 170 $\mu$m thick glass coverslip. The tweezer array is projected upward through the coverslip and is positioned in a plane 8 $\mu$m above the coverslip and more than 20 $\mu$m below the upper microscope slide. The silica spheres are stably trapped in three-dimensions in each of the sixteen optical tweezers 10.

In FIG. 7B is shown the optically-organized arrangement of spheres 1/30 second after the optical tweezers 10 (traps) were extinguished but before the spheres had time to diffuse away from the trap site.

While preferred embodiments of the invention have been shown and described, it will be clear to those skilled in the art that various changes and modifications can be made without departing from the invention in its broader aspects as set forth in the claims provided hereinafter.

What is claimed is:

1. An apparatus for manipulating particles by forming an optical trap, comprising:
    a diffractive optical element for receiving a light beam and forming a plurality of separate light beams; and
    a focusing element downstream from said diffractive optical element, said diffractive optical element cooperating with said focusing element to separately converge each of the light beams to form a focussed spot to establish means for forming a separate optical trap within the spot for each of the particles using one of the separate light beams for each particle.

2. The apparatus as defined in claim 1 wherein said diffractive optical element is selected from the group consisting of an optical grating and a hologram.

3. The apparatus as defined in claim 1 further including a system for producing a laser beam for input to said diffractive optical element.

4. The apparatus as defined in claim 1 wherein said focusing element comprises at least one of an objective lens and a diffractive optical element.

5. The apparatus as defined in claim 1 further including a telescope lens system disposed downstream from said diffractive optical element after interaction of the light beam with said diffractive element.

6. The apparatus as defined in claim 5 wherein said diffractive optical element is disposed perpendicular to an optical axis of said telescope lens system.

7. The apparatus as defined in claim 5 wherein said diffractive optical element is disposed obliquely to an optical axis of said telescope lens system.

8. The apparatus as defined in claim 1 wherein said diffractive optical element creates a plurality of diffracted output light beams.

9. The apparatus as defined in claim 1 wherein said diffractive optical element is disposed substantially in a plane conjugate to a back aperture of said objective lens element.

10. The apparatus as defined in claim 1 wherein said diffractive optical element is constructed to form optical traps at spatial locations selected from the group consisting of positions in a focal plane and out of a focal plane formed by said objective lens element.

11. The apparatus as defined in claim 1 wherein said diffractive optical element comprises a dynamically changing diffractive component enabling dynamically changing optical traps to be formed by the apparatus.

12. The apparatus as defined in claim 11 wherein said dynamically changing diffractive component comprises a computer-generated hologram.

13. The apparatus as defined in claim 12 wherein said apparatus further includes a liquid crystal component which is imprinted with the computer-generated hologram.

14. The apparatus as defined in claim 5 further including a mirror disposed for movement and positioned to receive the light beam downstream from the telescope lens system.

15. The apparatus as defined in claim 1 further including means for performing at least one of steering and focusing the optical trap.

16. The apparatus as defined in claim 15 wherein the means for performing comprises a diffractive optical element.

17. An apparatus for manipulating particles by forming a plurality of optical traps, comprising:
   a diffractive optical element for receiving a laser beam and forming a plurality of separate light beams;
   a first telescope lens system disposed downstream from said diffractive optical element after interaction of the light beam with said diffractive element; and
   optical means for individually converging the separate light beam output from said diffractive optical element and said telescope lens system said optical means, said telescope lens system and said diffractive optical element cooperating to provide means for forming an optical trap for each of the particles.

18. The apparatus as defined in claim 17 further including a mirror disposed to enable movement of the optical trap.

19. The apparatus as defined in claim 17 wherein said mirror is mounted to enable translation of the optical trap laterally and vertically.

20. The apparatus as defined in claim 18 further including a second telescope lens system disposed downstream from said first telescope lens system and said mirror.

21. The apparatus as defined in claim 17 wherein said optical means comprises at least one of an objective lens and a diffractive optical element positioned to receive the light beam received from said telescope lens system.

22. The apparatus as defined in claim 20 further including a beamsplitter disposed between said second telescope lens system and said optical means, thereby enabling viewing of images of the particles being manipulated.

23. A method for manipulating small dielectric particles, comprising the steps of:
   generating a laser beam;
   inputting the laser beam to a diffractive element, passing the diffracted laser beam through a telescope lens system; and
   focusing the laser beam output from the telescope lens system to form an optical trap for manipulating the small dielectric particles.

24. The method as defined in claim 23 further including the step of steering the laser beam using a mirror to thereby move the optical trap.

25. A system including an apparatus for manipulating a plurality of particles and also including a desired array of particles, comprising:
   a light source for producing a light beam;
   a diffractive optical element for receiving the light beam and forming a plurality of separate light beams;
   a focusing element downstream from said diffractive optical element, said diffractive optical element cooperating with said focusing element to provide means for forming a separate light beam spot for forming an optical trap within the separate spot for each of the particles using one of the separate light beams for each particle; and
   a plurality of particles positioned by said means for forming an optical trap to form a desired array of said plurality of particles.

26. The system as defined in claim 25 wherein said diffractive optical element is selected from the group consisting of an optical grating and a hologram.

27. The system as defined in claim 25 wherein said light source comprises a laser.

28. The system as defined in claim 25 wherein said desired array comprises a dynamically changing array of said particles.

29. The system as defined in claim 23 wherein said focusing element comprises at least one of an objective lens and a diffractive optical element.

30. The apparatus as defined in claim 25 further including a telescope lens system disposed downstream from said diffractive optical element after interaction of the light beam with said diffractive element.

31. The apparatus as defined in claim 25 wherein said diffractive optical element is disposed perpendicular to an optical axis of said telescope lens system.

32. The apparatus as defined in claim 25 wherein said diffractive optical element is disposed obliquely to an optical axis of said telescope lens system.

33. The apparatus as defined in claim 25 wherein said diffractive optical element creates a plurality of diffracted output light beams.

34. The apparatus as defined in claim 25 wherein said diffractive optical element is disposed substantially in a plane conjugate to a back aperture of said objective lens element.

35. The apparatus as defined in claim 25 wherein said diffractive optical element is constructed to form optical traps at spatial locations selected from the group consisting of positions in a focal plane and out of a focal plane formed by said objective lens element.

36. The apparatus as defined in claim 25 wherein said diffractive optical element comprises a dynamically changing diffractive component enabling dynamically changing optical traps to be formed by the apparatus.

37. The apparatus as defined in claim 36 wherein said dynamically changing diffractive component comprises a computer-generated hologram.

38. The apparatus as defined in claim 37 wherein said apparatus further includes a liquid crystal component which is imprinted with the computer-generated hologram.

39. The apparatus as defined in claim 30 further including a mirror disposed for movement and positioned to receive the light beam downstream from the telescope lens system.

40. The apparatus as defined in claim 39 further including means for performing at least one of steering and focusing the optical trap.

41. An apparatus for manipulating particles by forming an optical trap, comprising:
   a diffractive optical element for receiving a light beam and forming a plurality of separate light beams;
   at least one telescope lens system disposed downstream from said diffractive optical element after interaction of the light beam with said diffractive element; and
   a focusing element downstream from said diffractive optical element, said diffractive optical element cooperating with said focusing element to separately converge each of the light beams to establish means for forming a separate optical trap for each of the particles using one of the separate light beams for each particle.

42. The system as defined in claim 41 wherein said focusing element comprises at least one of an objective lens and a diffractive optical element.

43. The system as defined in claim 41 wherein said diffractive optical element includes means for forming a dynamically changing array of particles.

44. The apparatus as defined in claim 41 wherein said diffractive optical element is disposed substantially in a plane conjugate to a back aperture of said focusing element.

45. The apparatus as defined in claim 41 wherein said diffractive optical element is constructed to form optical traps at spatial locations selected from the group consisting of positions in a focal plane and out of a focal plane formed by said focusing element.

46. The apparatus as defined in claim 41 wherein said diffractive optical element comprises a dynamically changing diffractive component enabling dynamically changing optical traps to be formed by the apparatus.

47. The apparatus as defined in claim 41 further including a mirror disposed for movement and positioned at a point conjugate to a back aperture of said focusing element created by said at least one telescope lens system.

48. The apparatus as defined in claim 47 further including means for performing steering of the optical trap.

49. The apparatus as defined in claim 47 further including means for performing focusing of the optical trap.

* * * * *

UNITED STATES PATENT AND TRADEMARK OFFICE
CERTIFICATE OF CORRECTION

PATENT NO. : 6,055,106
DATED : April 25, 2000
INVENTOR(S) : Grier et al.

Page 1 of 1

It is certified that error appears in the above-identified patent and that said Letters Patent is hereby corrected as shown below:

Column 5,
Line 2, after "lens)" should be -- or diffractive optical element --.
Line 17, after "move", insert --or steer --.

Column 7,
Line 27, after "system", insert -- , with --.

Column 8, claim 29,
Line 17, "claim 23" should be -- claim 25 --.

Signed and Sealed this

Twenty-fifth Day of December, 2001

Attest:

Attesting Officer

JAMES E. ROGAN
Director of the United States Patent and Trademark Office